T. A. MILUTIN.
TRACTOR.
APPLICATION FILED APR. 6, 1920.

1,368,279.

Patented Feb. 15, 1921.
3 SHEETS—SHEET 1.

Inventor
Theodore A. Milutin
By S. E. Thomas
Attorney

T. A. MILUTIN.
TRACTOR.
APPLICATION FILED APR. 6, 1920.
1,368,279.
Patented Feb. 15, 1921.
3 SHEETS—SHEET 2.
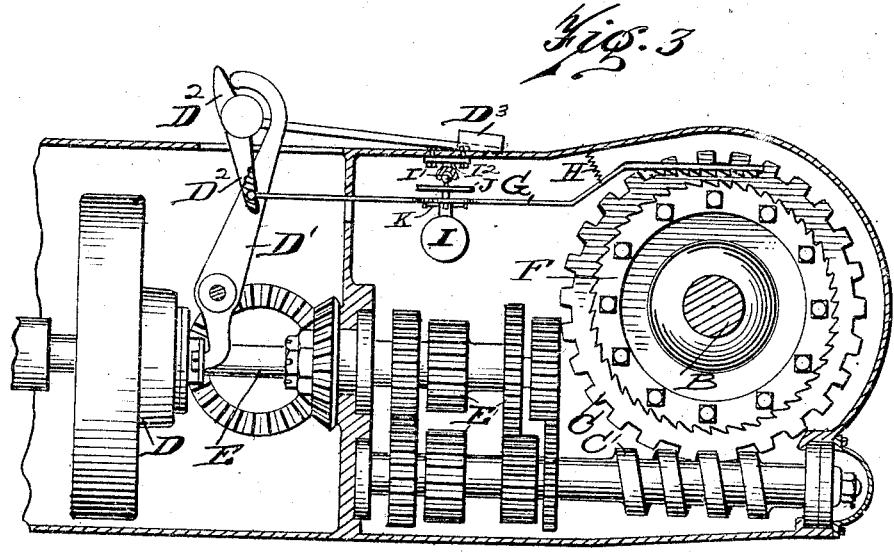
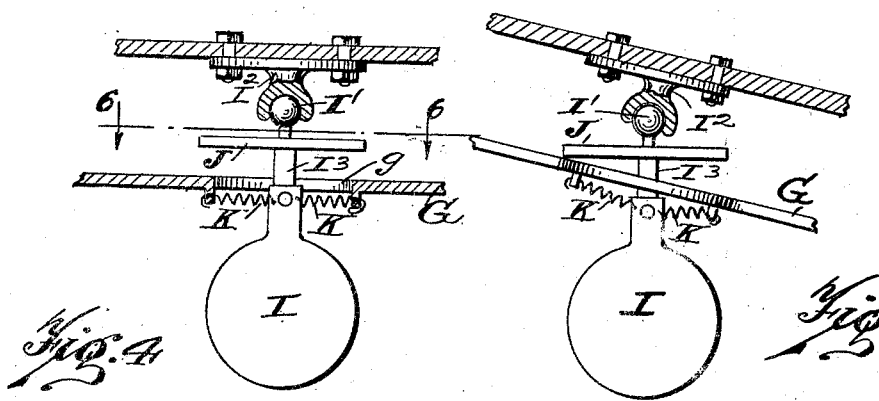
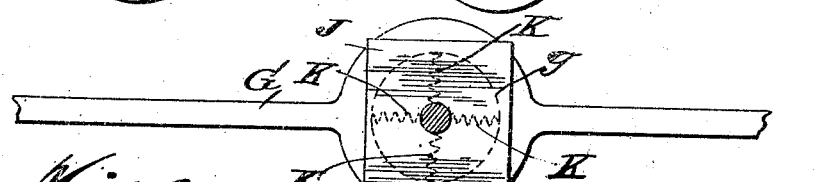
Inventor
Theodore A. Milutin
By S. E. Thomas
Attorney

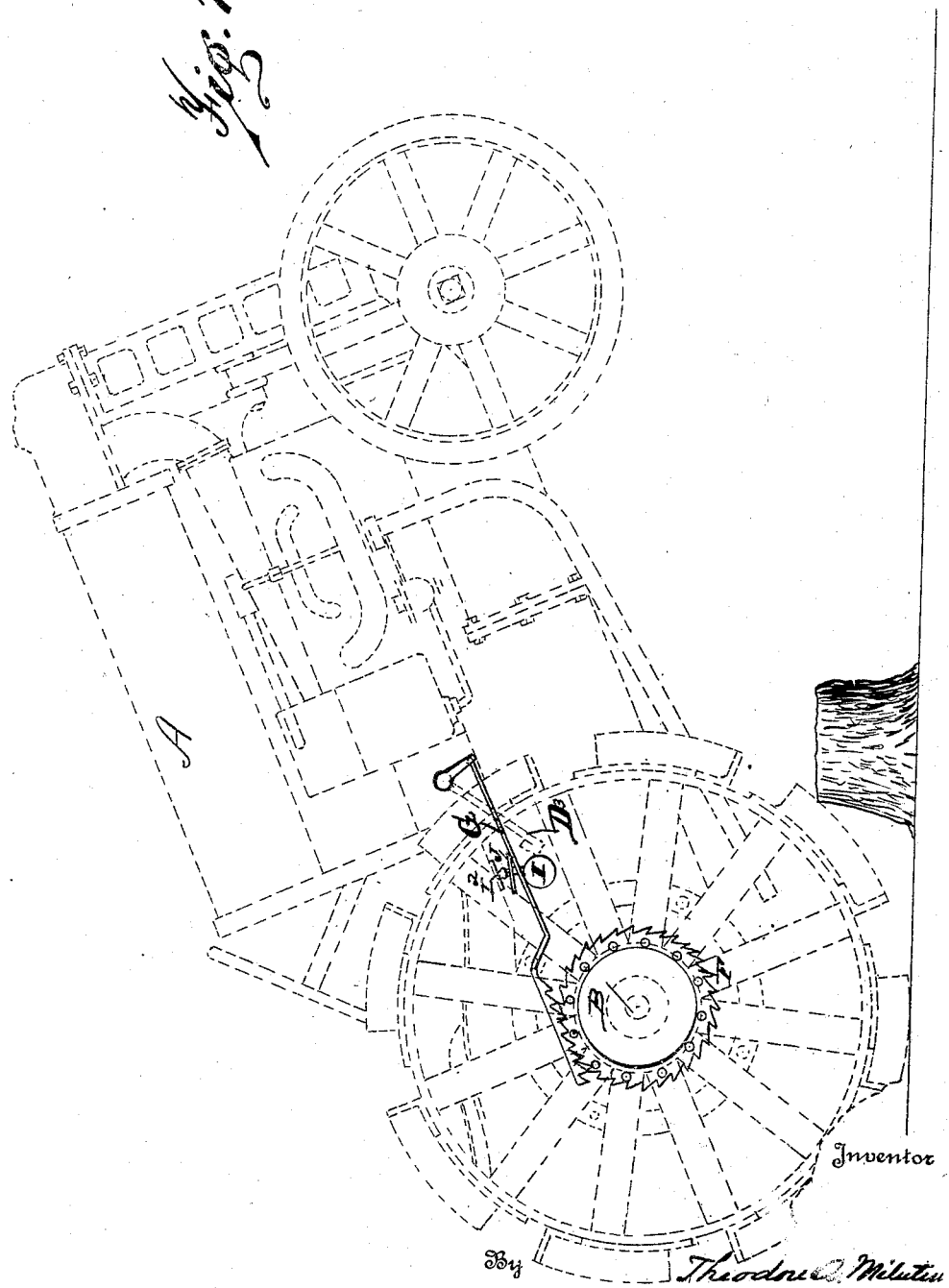

UNITED STATES PATENT OFFICE.

THEODORE A. MILUTIN, OF DEARBORN, MICHIGAN.

TRACTOR.

1,368,279.  Specification of Letters Patent.  Patented Feb. 15, 1921.

Application filed April 6, 1920. Serial No. 371,658.

*To all whom it may concern:*

Be it known that I, THEODORE A. MILUTIN, citizen of Russia, residing at Dearborn, county of Wayne, State of Michigan, have invented a certain new and useful Improvement in Tractors, and declare the following to be a full, clear, and exact description of the same, such as will enable others skilled in the art to which it pertains to make and use the same, reference being had to the accompanying drawings, which form a part of this specification.

My invention relates to an attachment to tractors which is designed to automatically prevent the tractor from overturning as a result of a sudden stoppage of its movement due to encountering an obstruction while in motion.

It is a matter of common knowledge that many very serious accidents in the use of certain well known tractors are the result of the machine overturning upon meeting an obstruction, for unless the operator instantly releases the driving clutch or otherwise stops the motive power of the machine its forward end will rise from the ground until attaining a certain degree of angularity it will overturn, which frequently results in the death of the operator.

It is therefore one of the objects of the present invention to provide automatically operated means adapted to release the driving clutch before the forward end of the tractor attains a sufficient degree of angularity to cause it to overturn and thereby injure the driver or damage the machine.

With the foregoing and other objects in view which will appear as the description proceeds, the invention resides in the combination and arrangement of parts and in the details of construction hereinafter described and claimed, it being understood that changes may be made in the precise embodiment of the invention herein disclosed without departing from the spirit of the same.

In the accompanying drawings forming part of this specification:—

Fig. 3 is a side elevation of a transmission and clutch assembly, with parts in section, showing means for automatically releasing the clutch mechanism.

Fig. 4 is a detail view of the swinging weight for automatically controlling the release of the clutch mechanism as it would appear when the clutch is engaged.

Fig. 5 is a similar detail view of the swinging weight as it would appear when effecting the release of the clutch mechanism.

Fig. 6 is a detail plan view of the device shown in Figs. 4 and 5.

Fig. 7 is a side elevation of a tractor,—indicated in dotted lines—showing its forward end elevated from the ground as it would appear following the sudden stoppage of the machine,—and indicating in full lines means for automatically releasing the driving clutch mechanism that the tractor may return to its normal horizontal position.

Figure 1:
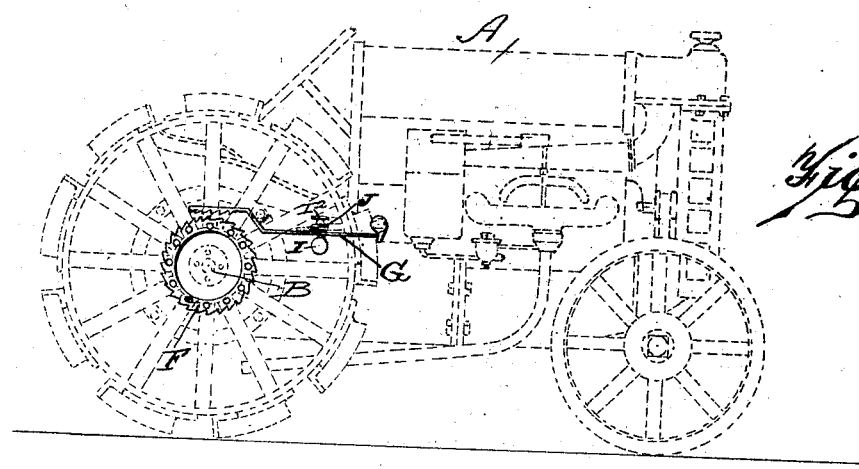
Figure 1 is a side elevation of a tractor,—indicated in dotted lines,—showing the invention in full lines installed thereon.
Figure 2:
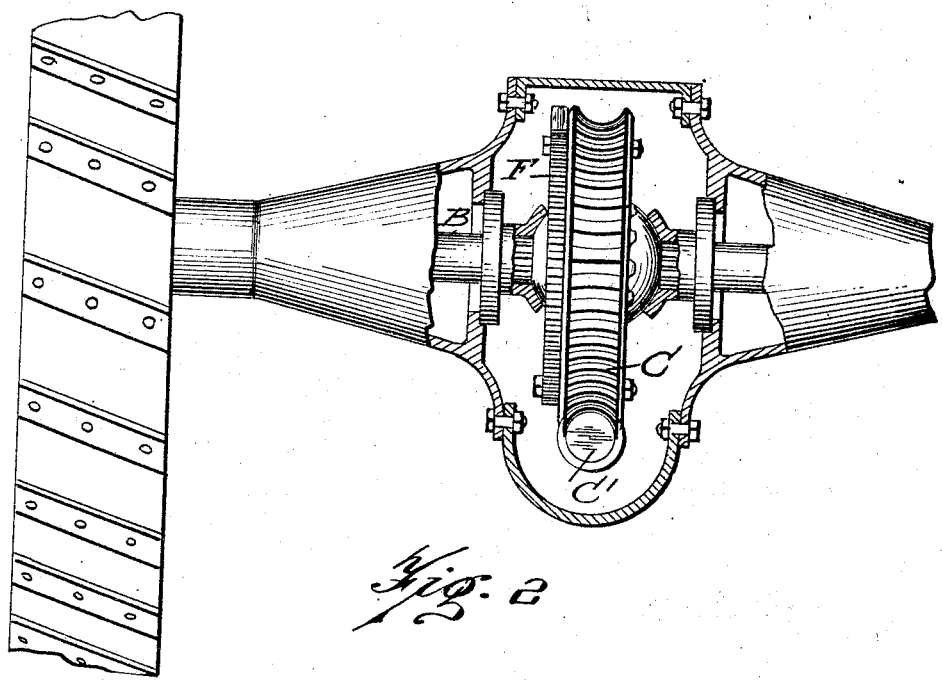
Fig. 2 is a fragmentary detail view of the rear axle, showing a ring ratchet-gear, forming a part of this invention, bolted to the worm wheel of the differential gearing.

Referring now to the letters of reference placed upon the drawings,

A, denotes a tractor, B, its rear axle, C, the usual worm wheel and C', the worm shaft of the differential gearing. D, indicates the driving clutch, and D', the clutch lever. $D^2$ is a rocking arm for operating the clutch lever, and $D^3$ the clutch pedal for actuating the rocking arm. E, indicates the transmission drive-shaft, and E' the driving gear. The foregoing elements are of usual and well known construction and are only referred to here that a clearer understanding may be had of the operation of this invention.

F, denotes a ring ratchet-gear bolted to the side of the worm-wheel C. G, indicates a bar provided with ratchet teeth at one end adapted to engage the ratchet teeth of the gear F,—its opposite end entering a socket formed for its reception in the end of the rocking arm $D^2$. H, is a suitable spring suspension for normally maintaining the teeth of the ratchet bar out of mesh with the ratchet-teeth of the gear F. I, is a swinging weight suspended from a universal joint I', carried by a bracket $I^2$, in turn bolted to the frame of the tractor.

The swinging weight is suspended from the universal joint by a stem $I^3$, extending through an opening $g$, in an enlarged portion of the ratchet bar G. To the stem $I^3$ is secured a disk or plate J, adapted when the tractor is elevated to bear upon the ratchet bar G to force the teeth of the bar into engagement with the teeth of the ratchet-gear F, should the forward end of the machine rise from the ground as a result of the stoppage of its movement while operating.

The teeth of the ratchet bar G having been forced into engagement with the teeth of the ratchet gear F, the bar is driven forward, thereby operating the levers D' and D² and thus releasing the driving clutch D, whereupon the tractor will return to its normal horizontal position.

It will be noted that as a result of the universal movement of the swinging weight the ratchet bar may be forced to engage the ratchet gear, and thereby release the clutch mechanism, should the tractor also tilt laterally to a predetermined degree.

To prevent the swinging weight I from oscillating too freely and thereby act upon the ratchet-bar to cause the release of the clutch mechanism when operating under ordinary conditions, a plurality of springs K are provided, connected with the stem of the weight and with the bar D, to yieldingly maintain the weight in a neutral position as shown in Fig. 4 of the drawings.

Having thus described my invention, what I claim is:—

1. In a tractor, the combination of a drive shaft, a driving clutch, a clutch controlling means, a ratchet gear adapted to be operated by the differential gearing of the rear axle, a ratchet bar connected at one end with the clutch controlling means, a swinging weight, means connected with the swinging weight adapted to bear upon the ratchet bar, whereby upon the tractor assuming an inclined position the swinging weight will force the rack bar into engagement with the ratchet wheel to release the clutch.

2. In a tractor, the combination of a driving shaft, a clutch, levers for operating said clutch, a differential gearing, a ratchet ring gear bolted to the worm wheel of the differential gearing, a swinging weight, a universal joint, from which the weight is suspended, a ratchet bar adapted to be brought into engagement with the ratchet ring gear and connected with the clutch levers, means carried by the swinging weight adapted to bear upon the ratchet bar, whereby when the swinging weight is actuated by a tilting movement of the tractor, said ratchet bar will be forced into engagement with the ratchet ring-gear to release the clutch.

3. In a tractor, the combination of a driving shaft, a driving clutch, levers for operating the clutch, a ratchet gear driven through the operation of the rear axle, a spring suspended ratchet bar connected at one end with the clutch levers and adapted to be forced into mesh with the ratchet gear, a swinging weight having means adapted to bear upon the ratchet bar to force the bar into engagement with the ratchet gear when actuated by the tilting of the tractor, whereby the driving clutch is released.

4. In a tractor, the combination of a driving shaft, a driving clutch, levers for operating the clutch, a ratchet gear driven through the operation of the rear axle, a bar connected at one end with the clutch levers and having ratchet teeth at its opposite end adapted to be forced into mesh with the teeth of the ratchet gear, a spring for suspending said bar normally out of mesh with the ratchet gear, a swinging weight having means adapted to bear upon said rod to force its ratchet portion into mesh with the ratchet gear, when operated by the tilting action of the tractor, and springs connected with the swinging weight for normally maintaining it in a neutral relation to the ratchet bar.

In testimony whereof I sign this specification in the presence of two witnesses.

THEODORE A. MILUTIN.

Witnesses:
S. E. THOMAS,
JOHN CONSIDINE, Jr.